United States Patent
Lam et al.

(10) Patent No.: US 9,974,248 B2
(45) Date of Patent: May 22, 2018

(54) PLANTER BOX, MULTIPURPOSE DIACOLATION PIPE AND METHOD FOR SOIL DRAINAGE AND IRRIGATION

(71) Applicant: Green Channels (International) Limited, Hong Kong (HK)

(72) Inventors: Kwok Hung Lam, Hong Kong (HK); Kwok Wai Lam, Hong Kong (HK)

(73) Assignee: Green Channels (International) Limited, Hong Kong (HK)

( * ) Notice: Subject to any disclaimer, the term of this patent is extended or adjusted under 35 U.S.C. 154(b) by 461 days.

(21) Appl. No.: 14/297,638

(22) Filed: Jun. 6, 2014

(65) Prior Publication Data
US 2014/0360097 A1 Dec. 11, 2014

(30) Foreign Application Priority Data
Jun. 6, 2013 (HK) .................... 13106739

(51) Int. Cl.
*A01G 27/00* (2006.01)
*A01G 1/00* (2006.01)
*A01G 25/06* (2006.01)

(52) U.S. Cl.
CPC ............ *A01G 27/00* (2013.01); *A01G 1/007* (2013.01); *A01G 25/06* (2013.01)

(58) Field of Classification Search
CPC .... A01G 27/00; A01G 27/001; A01G 27/005; A01G 27/006; A01G 27/008; A01G 9/14; A01G 31/00
USPC ....................... 47/66.7, 79; 405/48
See application file for complete search history.

(56) References Cited

U.S. PATENT DOCUMENTS

| | | | | |
|---|---|---|---|---|
| 1,350,229 A | * | 8/1920 | Lee | E02B 13/00 138/103 |
| 1,608,889 A | * | 11/1926 | Lampe | E02B 11/005 405/48 |
| 2,196,708 A | * | 4/1940 | Reid | F16L 9/04 138/115 |

(Continued)

FOREIGN PATENT DOCUMENTS

| | | |
|---|---|---|
| CN | 2822164 Y | 10/2006 |
| CN | 201172813 Y | 12/2008 |

(Continued)

OTHER PUBLICATIONS

Search Report of counterpart European Patent Application No. 14171417.0 dated Oct. 24, 2014.

(Continued)

*Primary Examiner* — Monica L Williams
*Assistant Examiner* — Aaron M Rodziwicz

(57) ABSTRACT

A planter box for holding planting soil includes a box body having a bottom wall, a sidewall and an open top. An anti-clog drainage and irrigation pipe is mounted across and above the bottom wall. The pipe includes a water inflow and outflow opening formed at a lower portion and extending along the length of the pipe. Two flow-guiding plates extend from two longitudinal sides of the water inflow and outflow opening towards an interior of the pipe body to form two overflow troughs in the pipe. During rainy day, the pipe is used for drainage. During sunny days, water can be supplied to the pipe for irrigation. A method for soil drainage and irrigation is also disclosed.

12 Claims, 8 Drawing Sheets

(56) References Cited

U.S. PATENT DOCUMENTS

| | | | | |
|---|---|---|---|---|
| 2,782,604 | A | * | 2/1957 | Mixon .................... E03F 1/003 210/257.1 |
| 3,369,367 | A | * | 2/1968 | Saad ........................ C02F 3/10 16/87 R |
| 3,870,236 | A | * | 3/1975 | Sahagun-Barragan A01G 25/02 138/42 |
| 3,993,248 | A | * | 11/1976 | Harmony ................ B05B 1/323 138/103 |
| 4,016,727 | A | * | 4/1977 | Osaka ................... E02B 11/005 138/111 |
| 4,057,930 | A | * | 11/1977 | Barham ................. A01G 31/02 47/16 |
| D264,116 | S | * | 4/1982 | Soderstrom ..................... 405/43 |
| 4,389,138 | A | * | 6/1983 | Soderstrom ........... E02B 11/005 138/111 |
| 4,402,631 | A | * | 9/1983 | Rosenthal ............. A01G 25/06 239/242 |
| D299,162 | S | * | 12/1988 | Fredblad ..................... D23/266 |
| D317,358 | S | * | 6/1991 | Spendrup ..................... D23/393 |
| 6,314,675 | B1 | * | 11/2001 | Costa .................... A01G 31/06 47/17 |
| 2009/0301399 | A1 | * | 12/2009 | Brown ................... A01G 31/02 119/226 |
| 2012/0000121 | A1 | * | 1/2012 | Swann .................... A01G 9/14 47/17 |
| 2013/0298463 | A1 | * | 11/2013 | Ke .......................... A01G 9/02 47/79 |
| 2013/0305601 | A1 | * | 11/2013 | Park ....................... A01G 31/04 47/17 |

FOREIGN PATENT DOCUMENTS

| | | | |
|---|---|---|---|
| CN | 201957502 U | 9/2011 | |
| SE | WO 8001180 A1 * | 6/1980 | ............ E02B 11/005 |
| WO | 8001180 A1 | 6/1980 | |

OTHER PUBLICATIONS

Search Report Prepared by the State Intellectual Property Office of the P.R.C of Counterpart Hong Kong Short-term Patent Application No. 13106739.8 dated Jul. 3, 2013.

* cited by examiner

PLANTER BOX, MULTIPURPOSE DIACOLATION PIPE AND METHOD FOR SOIL DRAINAGE AND IRRIGATION

CROSS-REFERENCE TO RELATED APPLICATIONS

This application claims the benefit of Hong Kong Short-term Patent Application No. 13106739.8 filed on Jun. 6, 2013, the entire content of which is hereby incorporated by reference.

FIELD OF THE TECHNOLOGY

The present application relates to a planter box, a multipurpose diacolation pipe and a method for soil drainage and irrigation.

BACKGROUND

In existing rooftop plantation, planting soil is usually placed in flower pots or laid on the rooftop. Flowers, plants and crops can be grown in the flower pots and on the rooftop to form a rooftop farmland or garden. The existing rooftop plantation may use rainwater as irrigation water. However, when rain is too heavy, there will be too much rainwater in the planting soil that will damage the plants. Furthermore, when rain is too heavy, planting soil and fertilizer will be washed away by rainwater and the surrounding environment will be polluted. Furthermore, conventional drainage pipes with drainage holes are employed to drain out rainwater in planting soil. However, these conventional drainage pipes are usually wrapped around by geotextile to filter the dirt from the drainage holes. However, after two to three years, the pipes will be blocked by the dirt.

The above description of the background is provided to aid in understanding the system and method for soil drainage and irrigation, but is not admitted to describe or constitute pertinent prior art to the system and method for soil drainage and irrigation, or consider the cited documents as material to the patentability of the claims of the present application.

SUMMARY

According to one aspect, the present application provides a planter box for holding therein planting soil. The planter box includes:

(a) a box body having a bottom wall, a sidewall connected to and extending upwardly from a periphery of the bottom wall, and an open top;

(b) an anti-clog drainage and irrigation pipe mounted across and above the bottom wall, the pipe having a pipe body;

(c) a water inflow and outflow opening formed at a lower portion of the pipe body and extending along the length of the pipe body in a longitudinal direction; and (d) two flow-guiding plates connected to and extending from two longitudinal sides of the water inflow and outflow opening towards an interior of the pipe body, and forming two overflow troughs extending along two opposite sides of the two flow-guiding plates respectively.

In one embodiment, the pipe body may be provided therein with a plurality of connecting pieces connecting the two flow-guiding plates at upper portions thereof, and the plurality of connecting pieces may be spaced apart from each other.

In one embodiment, the pipe body may be provided therein with a blocking plate connecting the two flow-guiding plates at upper portions thereof, and the blocking plate may be formed with a plurality of openings.

In one embodiment, the pipe body may be provided at each end thereof with a reinforcing member formed integrally with the two flow-guiding plates.

In one embodiment, the distance between the two flow-guiding plates may be gradually increasing from the water inflow and outflow opening towards the interior of the pipe body.

In one embodiment, the distance between the two flow-guiding plates may be gradually decreasing from the water inflow and outflow opening towards the interior of the pipe body.

In one embodiment, the planter box may further include a heightening board mounted on top of the box body, and the heightening board may be formed into a frame that matches the sidewall of the box body.

In one embodiment, one end of the pipe may be mounted on one side of the sidewall, the other end of the pipe may be mounted on an opposite side of the sidewall, and each end of the pipe may be connectable to an end of another pipe of another planter box to form an expandable planter box system.

In one embodiment, the box body may be rectangular in shape.

According to another aspect, there is provided a multipurpose diacolation pipe including:

(e) a pipe body;

(f) a water inflow and outflow opening formed at a lower portion of the pipe body and extending along the length of the pipe body in a longitudinal direction; and (g) two flow-guiding plates connected to and extending from two longitudinal sides of the water inflow and outflow opening towards an interior of the pipe body, and forming two overflow troughs extending along two opposite sides of the two flow-guiding plates respectively.

In one embodiment, the pipe body may be provided therein with a plurality of connecting pieces connecting the two flow-guiding plates at upper portions thereof, and the plurality of connecting pieces may be spaced apart from each other.

In one embodiment, the pipe body may be provided therein with a blocking plate connecting the two flow-guiding plates at upper portions thereof, and the blocking plate may be formed with a plurality of openings.

In one embodiment, the pipe body may be provided at each end thereof with a reinforcing member formed integrally with the two flow-guiding plates.

In one embodiment, the distance between the two flow-guiding plates may be gradually increasing from the water inflow and outflow opening towards the interior of the pipe body.

In one embodiment, the distance between the two flow-guiding plates may be gradually decreasing from the water inflow and outflow opening towards the interior of the pipe body.

In yet another aspect, the present application provides a method for drainage and irrigation of planting soil in outdoor and indoor plantation areas such as planter box, rooftop, slope, golf course, stadium, sports ground, highway, farmland and urban vegetable factory. The method includes the steps of:

(h) providing an anti-clog drainage and irrigation pipe comprising a water inflow and outflow opening formed at a lower portion of the pipe and extending along the length of the pipe in a longitudinal direction; and two flow-guiding plates connected to and extending from two longitudinal sides of the water inflow and outflow opening towards an interior of the pipe, and forming two overflow troughs extending along two opposite sides of the two flow-guiding plates respectively;

(i) forming a receptacle;

(j) laying the pipe across and above a bottom wall of the receptacle; and (k) filling the receptacle with planting soil so that the planting soil covers and encircles the pipe;

(l) whereby when water level in the planting soil is higher than top edges of the two flow-guiding plates, water in the planting soil automatically flows into the pipe through the water inflow and outflow opening, moves upwards between the two flow-guiding plates while allowing the planting soil inside the upwardly moving water to precipitate, overflows into the two overflow troughs, and drains out from the pipe.

In one embodiment, the method may further include the steps of connecting one end of the pipe to a water source; and supplying water from the water source to the pipe when water level in the planting soil is lower than the top edges of the two flow-guiding plates so that water flowing into the pipe overflows from the two overflow troughs, falls downwards between the two flow-guiding plates, and flows through the water inflow and outflow opening and into the planting soil.

In one embodiment, the method may further include the steps of recycling water drained out from the pipe and using the recycled water for irrigation.

In one embodiment, the method may further include the step of using a water pump to pump the recycled water into the pipe for irrigation.

In one embodiment, the receptacle may be a planter box.

Although the system and method for soil drainage and irrigation are shown and described with respect to certain embodiments, it is obvious that equivalents and modifications will occur to others skilled in the art upon the reading and understanding of the specification. The system and method for soil drainage and irrigation in the present application include all such equivalents and modifications, and is limited only by the scope of the claims.

BRIEF DESCRIPTION OF THE DRAWINGS

Specific embodiments of the system and method for soil drainage and irrigation will now be described by way of example with reference to the accompanying drawings wherein.

DETAILED DESCRIPTION

Figure 1:
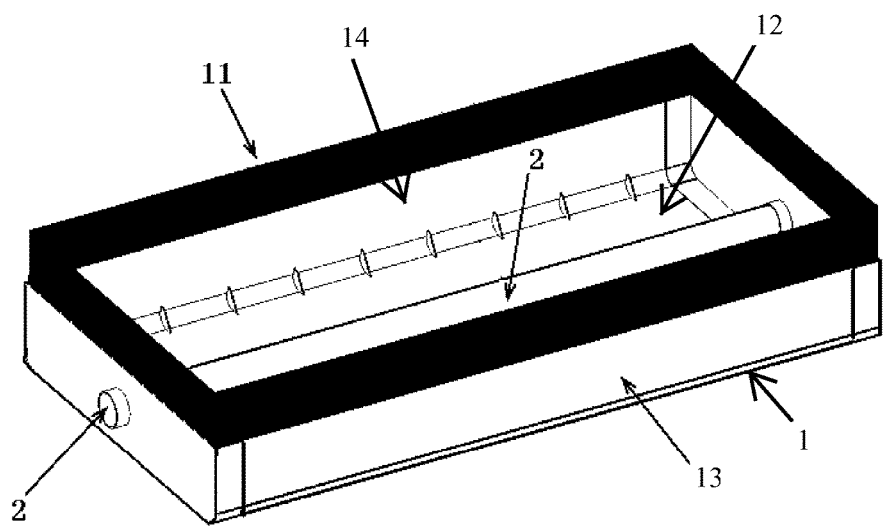
FIG. 1 is a perspective view of a planter box according to an embodiment of the present application.

Reference will now be made in detail to a preferred embodiment of the system and method for soil drainage and irrigation, examples of which are also provided in the following description. Exemplary embodiments of the system and method for soil drainage and irrigation are described in detail, although it will be apparent to those skilled in the relevant art that some features that are not particularly important to an understanding of the system and method for soil drainage and irrigation may not be shown for the sake of clarity.

Furthermore, it should be understood that the system and method for soil drainage and irrigation are not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the protection.

Certain terminology is used in the following description for convenience only and is not limiting. The words "lower," "upper," "top," and "bottom" designate directions in the drawings to which reference is made. The terminology includes the words noted above as well as derivatives thereof and words of similar import.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

Figure 2:
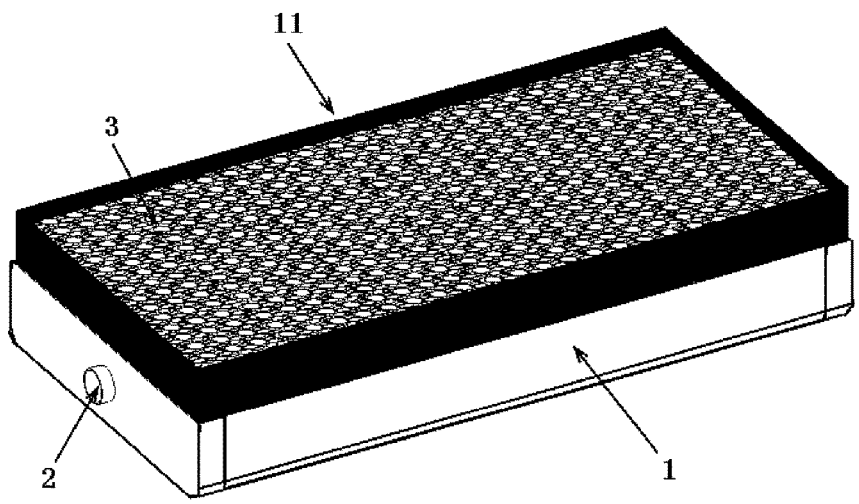
FIG. 2 is the planter box of FIG. 1 with soil.
Figure 3:
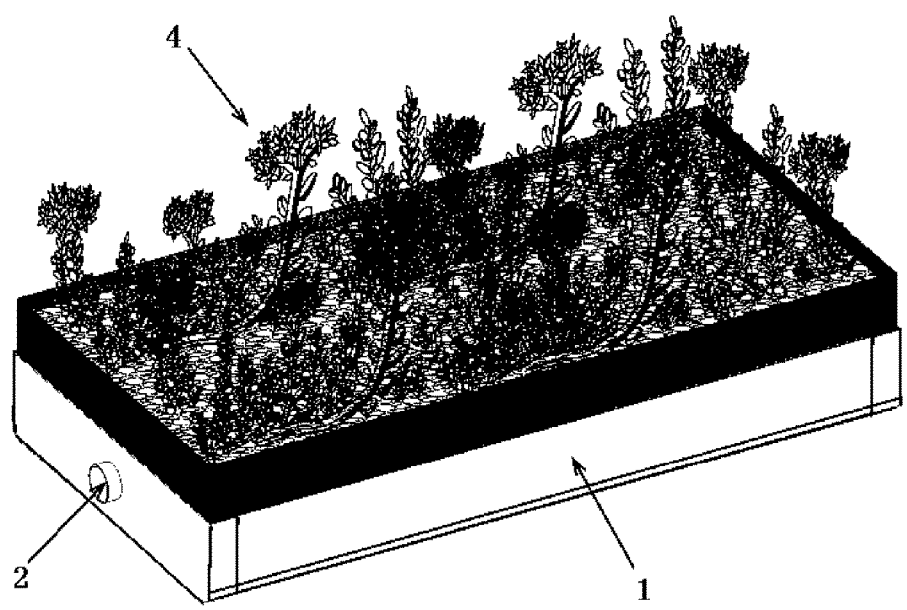
FIG. 3 is the planter box of FIG. 1 with soil and plants.

FIGS. 1 to 3 show a planter box according to an embodiment of the present application. The planter box may include a box body 1 for holding therein an anti-clog drainage and irrigation pipe 2, and planting soil 3.

The box body 1 may be made of plastic, metal, composite material or any other suitable material. The box body 1 may include a bottom wall 12, a sidewall 13 connected to and extending upwardly from a periphery of the bottom wall 12, and an open top 14. Although it is shown that the box body 1 is rectangular in shape, it is understood that the box body 1 can be in any other shape such as prismatic, cylindrical and elliptical cylindrical. The shape of the box body 1 can be regular or irregular.

The anti-clog drainage and irrigation pipe 2 is a multi-purpose diacolation pipe. It can be mounted across and above the bottom wall 12 of the box body 1. One end of the pipe 2 can be mounted on one side of the sidewall 12, and the other end of the pipe 2 can be mounted on an opposite side of the sidewall 12. The anti-clog drainage and irrigation pipe 2 of the planter box can be used for both soil drainage and irrigation.

To increase the height of the box body 1, the planter box may further include a plurality heightening boards 11 mounted on top of the box body 1. In the illustrated embodiment, the heightening boards 11 may be formed into a rectangular frame that matches the rectangular sidewall 12 of the box body 1. With the use of these heightening boards 11, the height of the box body 1 can be quickly and easily adjusted.

FIG. 2 is the planter box of FIG. 1 with planting soil 3. After the anti-clog drainage and irrigation pipe 2 is mounted inside the box body 1, it can be filled with planting soil 3. The planting soil 3 can cover and encircle the anti-clog drainage and irrigation pipe 2.

FIG. 3 is the planter box of FIG. 1 with planting soil 3 and plants 4. After the box body 1 is filled with planting soil 3, plants 4 can be planted and grown in the planting soil 3.

Figure 4:
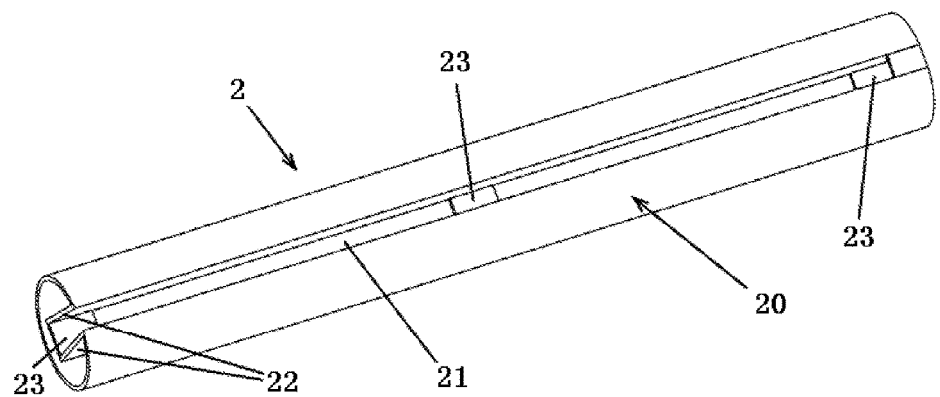
FIG. 4 is a bottom perspective view of an anti-clog drainage and irrigation pipe of the planter box according to a first embodiment of the present application.

FIG. 4 is a bottom perspective view of the anti-clog drainage and irrigation pipe 2 according to a first embodiment of the present application. The anti-clog drainage and irrigation pipe 2 has a pipe body 20. The pipe body 20 may include a water inflow and outflow opening 21 formed at a lower portion of the pipe body 20 and extending along the length of the pipe body 20 in a longitudinal direction.

The pipe body 20 may further include two flow-guiding plates 22 connected to and extending from two longitudinal sides of the water inflow and outflow opening 21 towards an interior of the pipe body 20, and form two overflow channels or troughs 28, 28' (shown in FIG. 13) extending along two opposite sides of the two flow-guiding plates 22 respectively. The two flow-guiding plates 22 may be symmetric about a vertical plane intersecting the central longitudinal axis x of the pipe body 20. However, it is understood that the two flow-guiding plates 22 may not necessary be symmetric about the vertical plane intersecting the central longitudinal axis x of the pipe body 20.

When the anti-clog drainage and irrigation pipe 2 is used for irrigation and the water level inside the pipe body 20 is over the top edges 29 (shown in FIG. 13) of the two flow-guiding plates 22, water will overflow from the two overflow troughs 28, 28', flow out through the water inflow and outflow opening 21 and into the planting soil 3 around the pipe body 20.

When the anti-clog drainage and irrigation pipe 2 is used for drainage and the water level around the pipe body 20 is over the top edges 29 of the two flow-guiding plates 22, water around the pipe body 20 will enter the pipe body 22 through the water inflow and outflow opening 21 and into the space between the two flow-guiding plates 22.

Since there is a certain distance between the water inflow and outflow opening 21 and the top edges 29 of the two flow-guiding plates 22, sand/soil in the water will precipitate when water slowly move upwards from the water inflow and outflow opening 21 to the top edges 29 of the two flow-guiding plates 22. This can prevent sand/soil from entering and clogging the pipe body 20.

The distance d between the two flow-guiding plates 22 may be gradually increasing or decreasing from the water inflow and outflow opening 21 upward towards the interior of the pipe body 20. It is also possible that the two flow-guiding plates 22 are parallel to each other.

Figure 5:
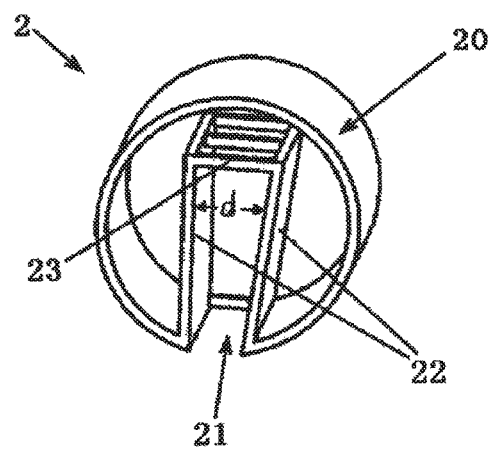
FIG. 5 is a perspective view of an end section of the anti-clog drainage and irrigation pipe of FIG. 4.
Figure 6:
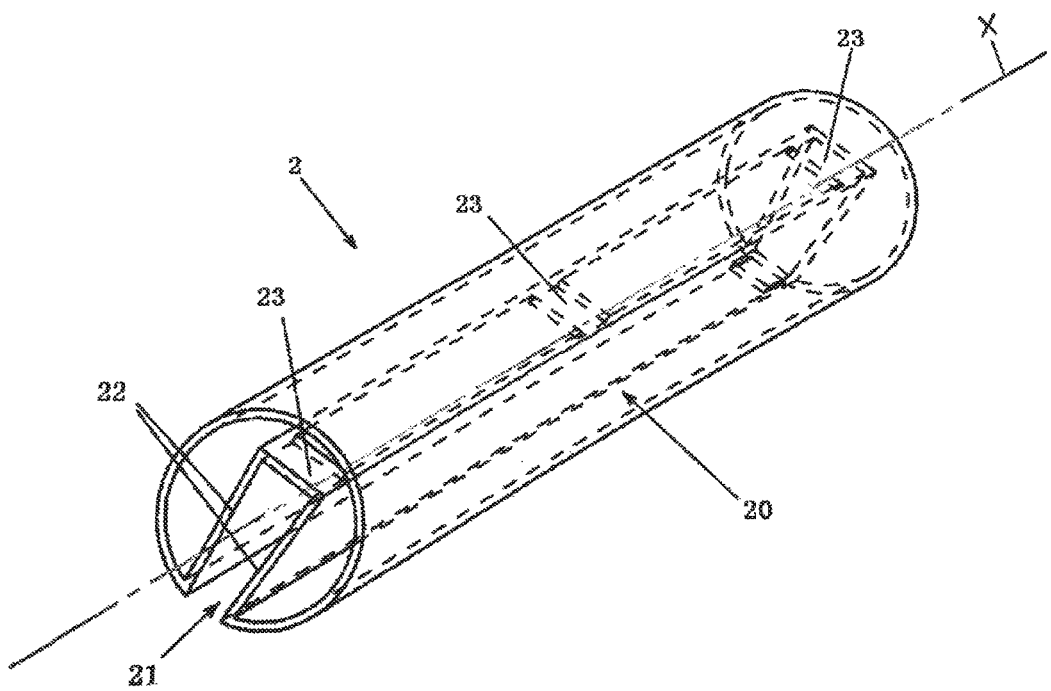
FIG. 6 is top perspective view of the anti-clog drainage and irrigation pipe of FIG. 4 with its interior structure shown in phantom lines.

FIG. 5 is a perspective view of an end section of the anti-clog drainage and irrigation pipe 2, and FIG. 6 is top perspective view of the anti-clog drainage and irrigation pipe 2 with its interior structure shown in phantom lines according to the first embodiment of the present application.

The pipe body 20 may be provided therein with a plurality of connecting bars or pieces 23 connecting the two flow-guiding plates 22 at upper portions thereof. The plurality of connecting pieces 23 can be spaced apart from each other. The plurality of connecting pieces 23 can define thereinbetween a plurality of openings through which water can pass. The plurality of connecting pieces 23 can strengthen the pipe body 20 and enhance its pressure resistance capacity. This can prevent the pipe body 20 from deforming when external force is applied on the pipe body 20.

Figure 7:
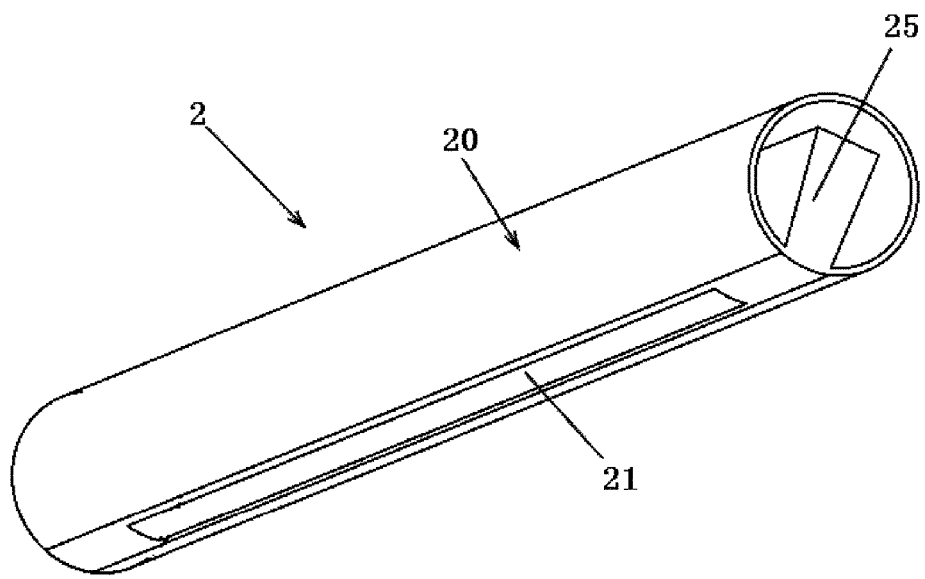
FIG. 7 is a bottom perspective view of the anti-clog drainage and irrigation pipe of the planter box according to a second embodiment of the present application.
Figure 8:
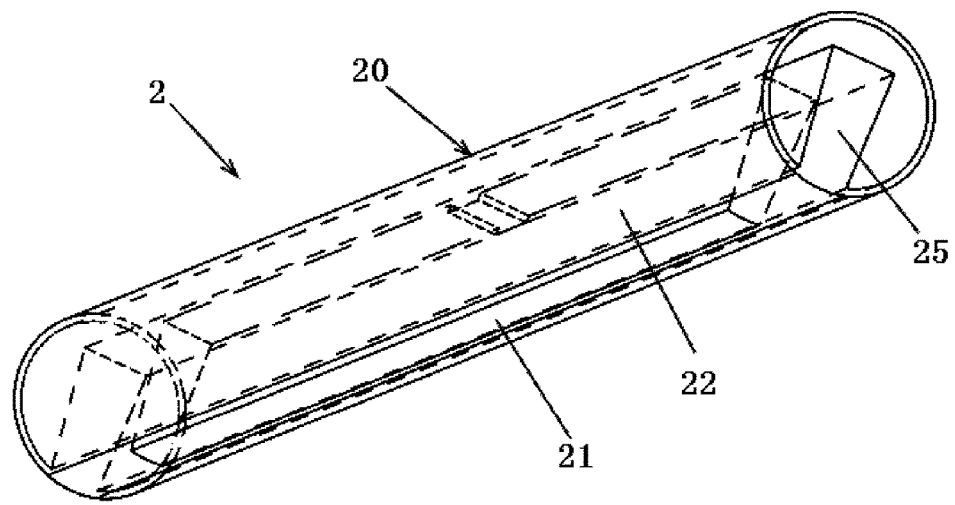
FIG. 8 is the same bottom view of the anti-clog drainage and irrigation pipe of FIG. 7 with its interior structure shown in phantom lines.

FIG. 7 is a bottom perspective view of the anti-clog drainage and irrigation pipe 2 according to a second embodiment of the present application, and FIG. 8 is the same bottom view of the anti-clog drainage and irrigation pipe 2 of FIG. 7 with its interior structure shown in phantom lines.

In addition to the plurality of connecting pieces 23, the pipe body 20 may be further provided at each end thereof with a reinforcing block or member 25 formed integrally with the two flow-guiding plates 22. The reinforcing members 25 can further strengthen the pipe body 20.

Figure 9:
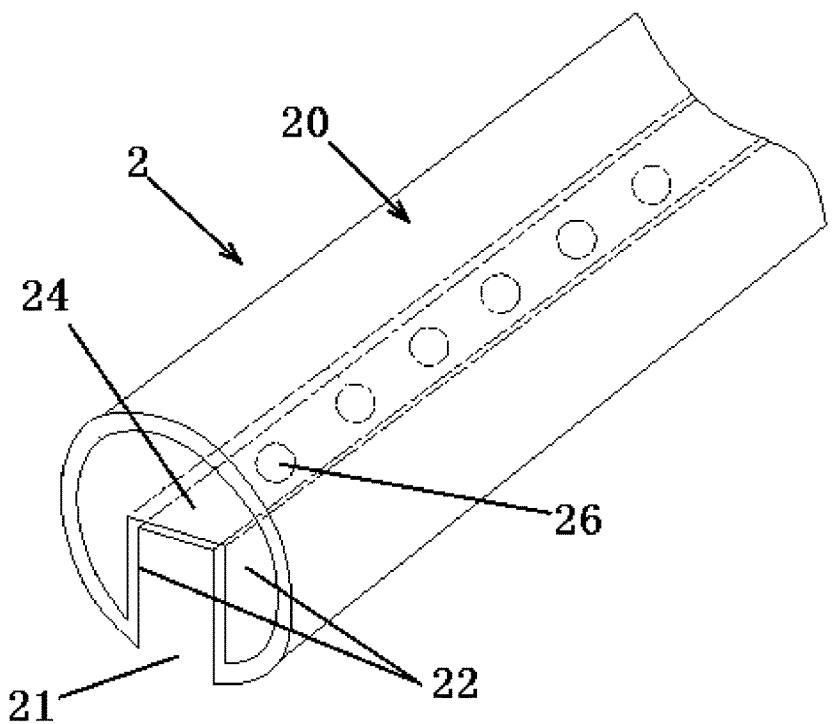
FIG. 9 is a fragmentary perspective view of the anti-clog drainage and irrigation pipe showing a blocking board with circular openings according to a third embodiment of the present application.

FIG. 9 is a fragmentary perspective view of the anti-clog drainage and irrigation pipe 2 according to a third embodiment of the present application.

The pipe body 20 may be provided therein with a blocking plate 24 connecting the two flow-guiding plates 22 at upper portions thereof. The blocking plate 24 may be formed with a plurality of circular openings 26. The blocking plate 24 can be used to strengthen the pipe body 20. The circular openings 26 can allow water to pass through. The blocking plate 24 can strengthen the two overflow troughs 28, 28', and further prevent sand/soil and foreign objects from entering the pipe body 20. This can achieve the anti-clogging function of the anti-clog drainage and irrigation pipe 2.

Figure 10:
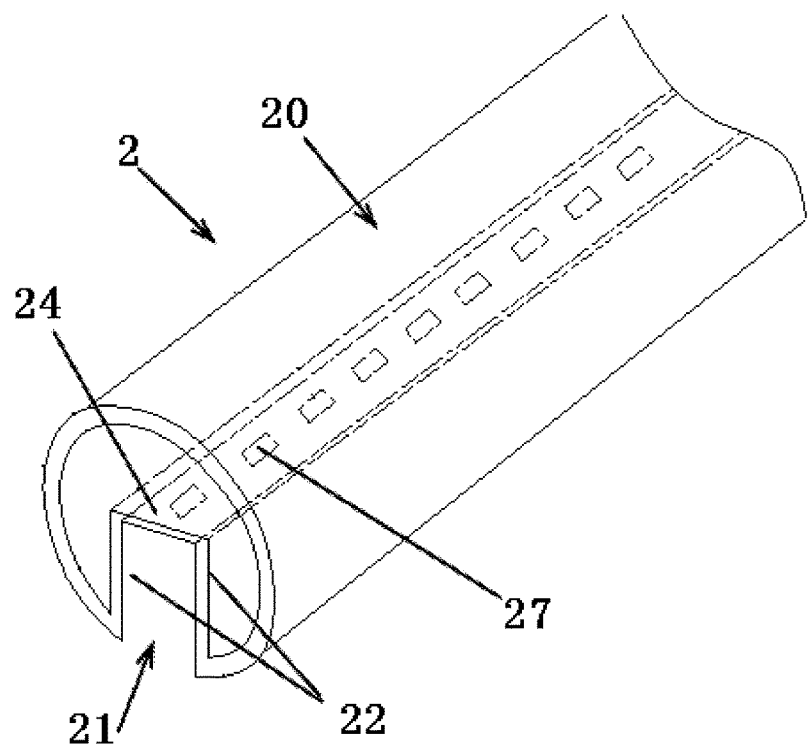
FIG. 10 is a fragmentary perspective view of the anti-clog drainage and irrigation pipe showing a blocking board with rectangular openings according to a fourth embodiment of the present application.

FIG. 10 is a fragmentary perspective view of the anti-clog drainage and irrigation pipe 2 showing a blocking plate 24 with rectangular openings 27 according to a fourth embodiment of the present application. It is understood that the openings 27 may be in any other shape such as polygonal.

Figure 11:
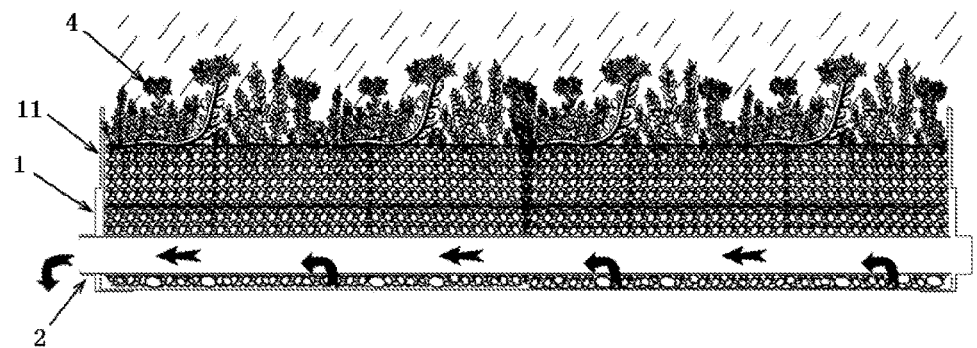
FIG. 11 is a longitudinal section view of a planter box being used for drainage according to an embodiment of the present application.
Figure 12:
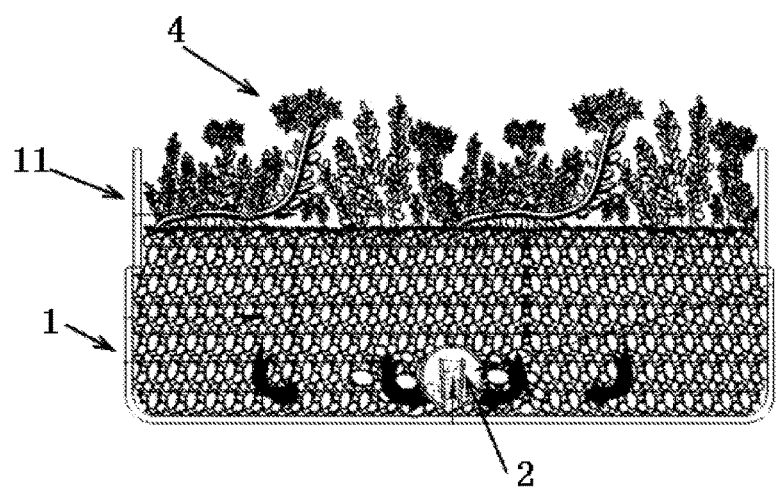
FIG. 12 is a transverse cross sectional view of a planter box being used for drainage according to an embodiment of the present application.
Figure 13:
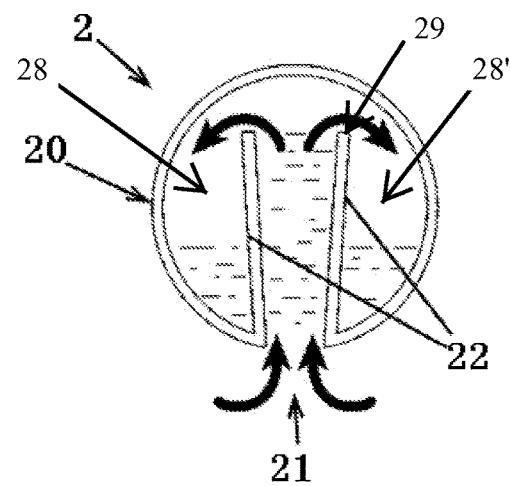
FIG. 13 is a cross sectional view of the anti-clog drainage and irrigation pipe showing rainwater drainage during rainy days according to an embodiment of the present application.

FIG. 11 is a longitudinal section view of the planter box being used for drainage according to an embodiment of the present application; FIG. 12 is a transverse cross sectional view of the planter box being used for drainage according to an embodiment of the present application; and FIG. 13 is a cross sectional view of the anti-clog drainage and irrigation pipe 2 showing rainwater drainage according to an embodiment of the present application.

When rain is heavy, the water level in the planting soil 3 gradually increases because the bottom wall 12 of the box body 1 is leak-proof. If water in the planting soil 3 becomes excessive, the planting soil 3 will become waterlogged and will affect the growth of the plants 4. Excess water needs to be drained out as soon as possible. When water level in the box body 1 is higher than the top edges 29 of the two flow-guiding plates 22 of the pipe body 20, water flows into the two overflow troughs 28, 28' through the water inflow and outflow opening 21, and drains out of the pipe body 20 along the two overflow troughs 28, 28'. This ensures that water level would not be too high and would not affect the growth of plants 4 inside the planter box.

Figure 14:
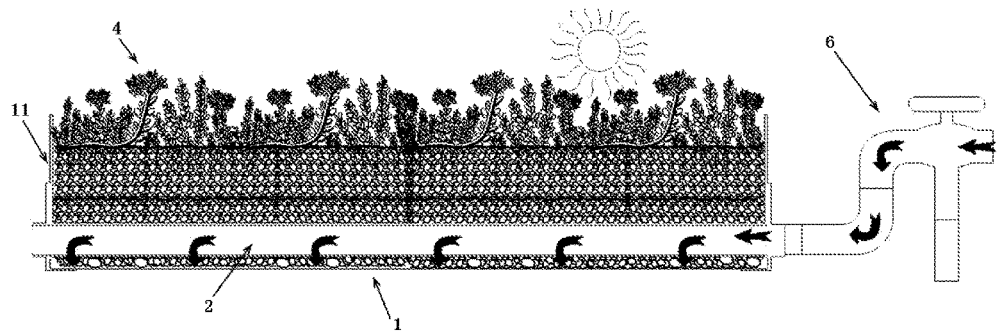
FIG. 14 is a longitudinal section view of a planter box being used for irrigation during sunny days according to an embodiment of the present application.
Figure 15:
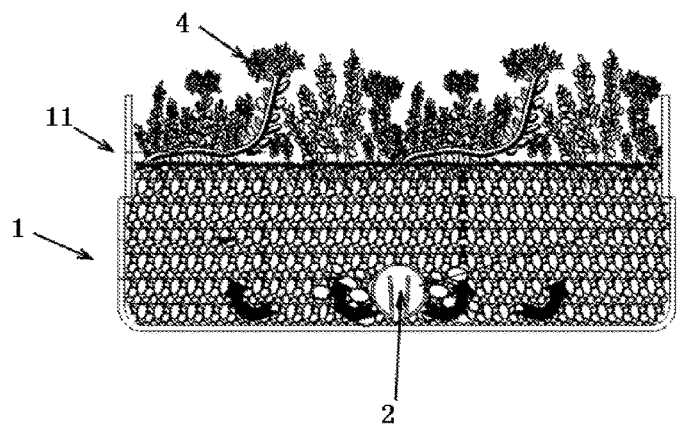
FIG. 15 is a transverse cross sectional view of a planter box being used for irrigation according to an embodiment of the present application.
Figure 16:
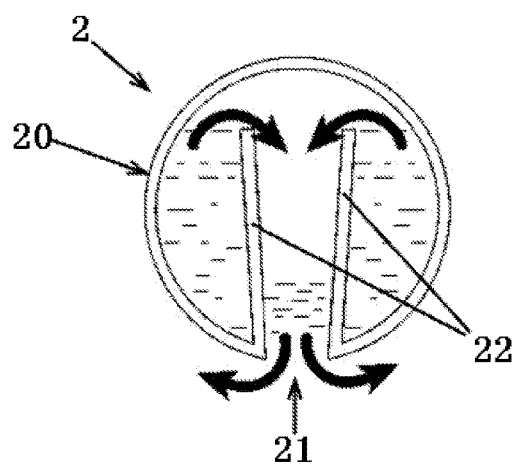
FIG. 16 is a cross sectional view of the anti-clog drainage and irrigation pipe showing water irrigation according to an embodiment of the present application.

FIG. 14 is a longitudinal section view of the planter box being used for irrigation according to an embodiment of the present application; FIG. 15 is a transverse cross sectional view of the planter box being used for irrigation according to an embodiment of the present application; and FIG. 16 is a cross sectional view of the anti-clog drainage and irrigation pipe 2 showing water irrigation according to an embodiment of the present application.

To ensure healthy growth of plants 4 during dry and sunny days, irrigation needs to be carried out so as to avoid the affect of plant growth due to lack of water inside the box body 1. To irrigate, the anti-clog drainage and irrigation pipe 2 can be connected to water source such as a water tap. Water from the water source can flow into the pipe body 20. When water level in the two overflow troughs 28, 28' is higher than the top edges 29 of the two flow-guiding plates 22, water inside the two overflow troughs 28, 28' overflows and passes through the water inflow and outflow opening 21 and into the planting soil 3. This maintains suitable moisture in the soil 3, and promotes growth of the plants 4.

Figure 17:
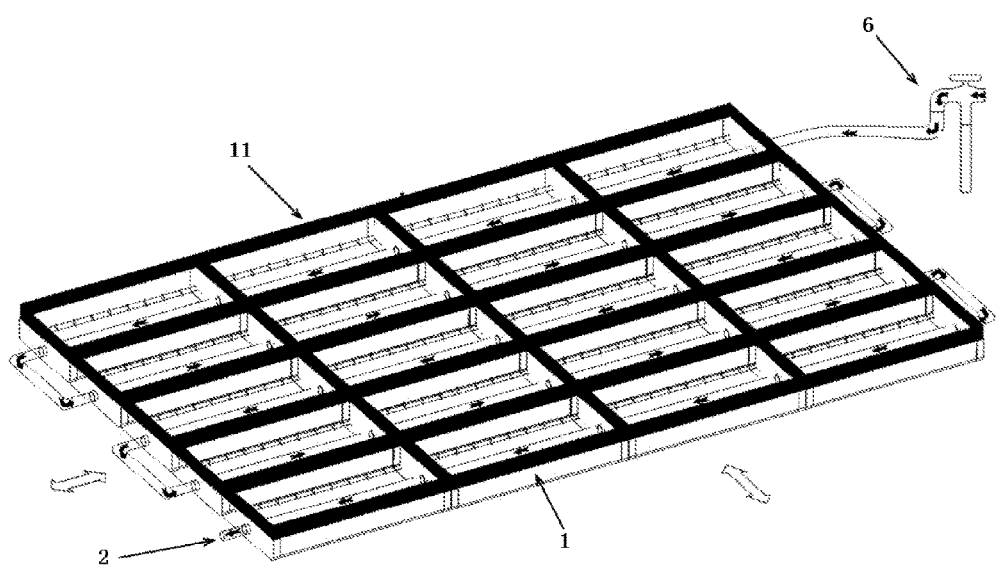
FIG. 17 is a perspective view of a planter box system.

FIG. 17 is a perspective view of a planter box system. A number of planter boxes of the present application can be connected side-by-side to form a planter box system which can be expandable, if needed. The anti-clog drainage and irrigation pipe 2 can be connected end-to-end in series to form a single water passage. The water passage can be used for both drainage and irrigation.

The present application also discloses a method for drainage and irrigation of planting soil in outdoor and indoor plantation areas such as planter box, rooftop, slope, golf course, stadium, sports ground, highway, farmland, urban vegetable factory, etc. First of all, one can provide an anti-clog drainage and irrigation pipe 2. This anti-clog drainage and irrigation pipe 2 may include a water inflow and outflow opening 21 formed at a lower portion of the pipe 2 and extending along the length of the pipe 2 in a longitudinal direction. The pipe 2 may also include two flow-guiding plates 22 connected to and extending from two longitudinal sides of the water inflow and outflow opening 21 towards an interior of the pipe 2, and forming two overflow troughs 28, 28' extending along two opposite sides of the two flow-guiding plates 22 respectively.

Then, one can form a box or receptacle. This receptacle will have a bottom wall, a sidewall connected to and extending upwardly from a periphery of the bottom wall, and an open top. The pipe can be laid across and above the bottom wall of the receptacle. Finally, the receptacle can be filled with planting soil so that the planting soil covers and encircles the pipe.

When water level in the planting soil is higher than top edges 29 of the two flow-guiding plates 22, water in the planting soil automatically flows into the pipe 2 through the water inflow and outflow opening 21, moves upwards between the two flow-guiding plates 22 while allowing the planting soil inside the upwardly moving water to precipitate, overflows into the two overflow troughs 28, 28', and drains out from the pipe 2.

To irrigate, one can connect one end of the pipe 2 to a water source; and supply water from the water source to the pipe 2 when water level in the planting soil is lower than the top edges 29 of the two flow-guiding plates 22 so that water flowing into the pipe 2 overflows from the two overflow troughs 28, 28', falls downwards between the two flow-guiding plates 22, and flows through the water inflow and outflow opening 21 and into the surrounding planting soil.

The planter box can be applied to rooftop plantation. Encircling boards can be provided on the rooftop and form a plantation space for holding soil for planting. The anti-clog drainage and irrigation pipe 2 can be laid on the bottom of the plantation space. The anti-clog drainage and irrigation pipe 2 has a pipe body 20. The pipe body 20 may include a water inflow and outflow opening 21 formed at a lower portion of the pipe body 20 and extending in a longitudinal direction thereof. The pipe body 20 may further include two flow-guiding plates 22 connected to and extending from two longitudinal sides of the water inflow and outflow opening 21 respectively towards an interior of the pipe body 20, and form two overflow troughs 28, 28' between the two flow-guiding plates 22 and the pipe body 20 respectively. The anti-clog drainage and irrigation pipe 2 can be one or more of the anti-clog drainage and irrigation pipe 2 shown in FIGS. 4-10.

For traditional green roofs, one needs to spend a lot of time and many steps to achieve waterproofing, drainage, filtering, and so on. The anti-clog drainage and irrigation pipe 2 can solve all these problems. Rainwater can also be recycled.

Since the water inflow and outflow opening 21 is formed at a lower portion of the anti-clog drainage and irrigation pipe 2 and the upper portion of the pipe 2 is closed, water flows into the anti-clog drainage and irrigation pipe 2 from bottom to top. Soil would not be able to enter the anti-clog drainage and irrigation pipe 2. Therefore, it is not necessary to use geotextile to wrap around the anti-clog drainage and irrigation pipe 2 as in conventional manner. Water enters the anti-clog drainage and irrigation pipe 2 from the water inflow and outflow opening 21 and into the two overflow troughs 28, 28' and then drains out from the pipe 2. This can increase the life of the anti-clog drainage and irrigation pipe 2, reduce construction material, simplify construction procedure, and lower the cost of construction.

Without using geotextile, the pipe 2 can function for many years without blocking. It can save millions of dollars on maintenance for some big highway projects.

For traditional golf course and sports ground, the drainage and irrigation system are normally two separated systems. The anti-clog drainage and irrigation pipe 2 can put both systems into one system.

For indoor and outdoor plantation, one can first use a plastic film to cover a cement surface. Then, one or more anti-clog drainage and irrigation pipes 2 can be laid on the plastic film. Finally, the anti-clog drainage and irrigation pipes 2 can be covered and encircled by planting soil. When rainwater enters the planting soil, the anti-clog drainage and irrigation pipes 2 can drain out rainwater and recycle it for irrigation. Hence, the planting soil will not become waterlogged and will not damage the plants. Furthermore, fertilizer and planting soil would not be washed away and therefore would not pollute the surrounding environment. An automatic irrigation water pump can also be installed. One can set the time for irrigation. When rainwater is recycled, the recycled rainwater can be pumped out by the water pump for irrigation, or for other purposes.

The plantation system of the present application is a totally closed system. Fertilizer will not be washed away. Irrigation water would not flow out and pollute the surrounding environment. The fertilizer and water can be totally absorbed by the plants. Automatic water drainage and recycle of rainwater can be carried out at any indoor and outdoor areas. It can improve indoor air quality. It can create a healthy green environment in school and office and at home.

While the system and method for soil drainage and irrigation has been shown and described with particular references to a number of preferred embodiments thereof, it should be noted that various other changes or modifications may be made without departing from the scope of the appended claims.

What is claimed is:

1. A planter box for holding therein planting soil, the planter box comprising:
    (a) a box body having a leak-proof bottom wall, a sidewall connected to and extending upwardly from a periphery of the bottom wall, and an open top;
    (b) an anti-clog drainage and irrigation pipe mounted across and above the bottom wall, the pipe having a pipe body and connecting to a water source;
    (c) a water inflow and outflow opening formed at a lower portion of the pipe body and extending along the length of the pipe body in a longitudinal direction; and
    (d) two flow-guiding plates connected to and extending from two longitudinal sides of the water inflow and outflow opening upward towards an interior of the pipe body, and forming two overflow troughs extending along two opposite sides of the two flow-guiding plates respectively;
    (e) wherein distance between the two flow-guiding plates is gradually increasing from the water inflow and outflow opening upward towards the interior of the pipe body;
    (f) wherein upper portions of the two flow-guiding plates terminate at a position below an uppermost portion of the pipe body and above a central longitudinal axis thereof, and a blocking plate is extending between and connected to the two flow-guiding plates at the upper portions thereof, the blocking plate being formed with a plurality of openings; wherein the blocking plate strengthens the two overflow troughs, prevents sand, soil, foreign objects, or any combination thereof from entering the pipe body, and achieves anti-clogging function of the anti-clog drainage and irrigation pipe;
    (g) wherein when water in the planting soil becomes excessive and water level in the box body is higher than top edges of the two flow-guiding plates, the water flows into the two overflow troughs through the water inflow and outflow opening, and drains out of the pipe body along the two overflow troughs to ensure that the planting soil is not too waterlogged to affect growth of plants inside the planter box; when water from the water source flows into the pipe body and water level in the two overflow troughs is higher than the top edges of the two flow-guiding plates, water inside the two overflow troughs overflows and passes through the water inflow and outflow opening and into the planting soil to maintain suitable moisture in the planting soil, and promote the growth of the plants.

2. The planter box as claimed in claim 1, wherein the pipe body is provided therein with a plurality of connecting pieces connecting the two flow-guiding plates at upper portions thereof, the plurality of connecting pieces being spaced apart from each other.

3. The planter box as claimed in claim 1, wherein the pipe body is provided therein with a blocking plate connecting the two flow-guiding plates at upper portions thereof, the blocking plate being formed with a plurality of openings.

4. The planter box as claimed in claim 1, wherein the pipe body is provided at each end thereof with a reinforcing member formed integrally with the two flow-guiding plates.

5. The planter box as claimed in claim 1, further comprising a heightening board mounted on top of the box body, the heightening board being formed into a frame that matches the sidewall of the box body.

6. The planter box as claimed in claim 1, wherein one end of the pipe is mounted on one side of the sidewall, and the other end of the pipe is mounted on an opposite side of the sidewall, and wherein each end of the pipe is connectable to an end of another pipe of another planter box to form an expandable planter box system.

7. The planter box as claimed in claim 1, wherein the box body is rectangular in shape.

8. A method for drainage and irrigation of planting soil in outdoor and indoor plantation areas including planter box, rooftop, slope, golf course, stadium, sports ground, highway, farmland and urban vegetable factory, the method comprising the steps of:
    (a) providing an anti-clog drainage and irrigation pipe comprising a water inflow and outflow opening formed at a lower portion of the pipe and extending along the length of the pipe in a longitudinal direction; and two flow-guiding plates connected to and extending from two longitudinal sides of the water inflow and outflow opening upward towards an interior of the pipe, and forming two overflow troughs extending along two opposite sides of the two flow-guiding plates respectively;
        wherein distance between the two flow-guiding plates is gradually increasing from the water inflow and outflow opening upward towards the interior of the pipe body;
        wherein upper portions of the two flow-guiding plates terminate at a position below an uppermost portion of the pipe body and above a central longitudinal axis thereof, and a blocking plate is extending between and connected to the two flow-guiding plates at the upper portions thereof, the blocking plate being formed with a plurality of openings; wherein the blocking plate strengthens the two overflow troughs, prevents sand, soil, foreign objects, or any combination thereof from entering the pipe body, and achieves anti-clogging function of the anti-clog drainage and irrigation pipe;
        whereby water flows into the pipe body through the water inflow and outflow opening and into the two overflow troughs during drainage, and water overflows from the two overflow troughs and flows out of the pipe body through the water inflow and outflow opening during irrigation;
    (b) forming a receptacle;
    (c) laying the pipe across and above a bottom wall of the receptacle; and
    (d) filling the receptacle with planting soil so that the planting soil covers and encircles the pipe;
    (e) wherein when water in the planting soil becomes excessive and water level in the box body is higher than top edges of the two flow-guiding plates, the water flows into the two overflow troughs through the water inflow and outflow opening, and drains out of the pipe body along the two overflow troughs to ensure that the planting soil is not too waterlogged to affect growth of plants inside the receptacle; when water from a water source flows into the pipe body and water level in the two overflow troughs is higher than the top edges of the two flow-guiding plates, water inside the two overflow troughs overflows and passes through the water inflow and outflow opening and into the planting soil to maintain suitable moisture in the planting soil, and promote the growth of the plants.

9. The method as claimed in claim 8, further comprising the steps of connecting one end of the pipe to a water source; and supplying water from the water source to the pipe when water level in the planting soil is lower than the top edges of the two flow-guiding plates so that water flowing into the pipe overflows from the two overflow troughs, falls downwards between the two flow-guiding plates, and flows through the water inflow and outflow opening and into the planting soil.

10. The method as claimed in claim 8, further comprising the steps of recycling water drained out from the pipe and using the recycled water for irrigation.

11. The method as claimed in claim 10, further comprising the step of using a water pump to pump the recycled water into the pipe for irrigation.

12. The method as claimed in claim 8, wherein the receptacle is a planter box.

* * * * *